(12) United States Patent
Yun et al.

(10) Patent No.: US 6,856,972 B1
(45) Date of Patent: Feb. 15, 2005

(54) AUTOMATED METHOD FOR ANALYZING AND COMPARING FINANCIAL DATA

(75) Inventors: Dan Yun, Temperance, MI (US); Matt Tomilo, Dearborn, MI (US); Peter Coote, Bloomfield, MI (US); Peter Przybocki, Allen Park, MI (US); Serguei A. Lougovier, Westland, MI (US)

(73) Assignee: Ford Motor Company, Dearborn, MI (US)

( * ) Notice: Subject to any disclaimer, the term of this patent is extended or adjusted under 35 U.S.C. 154(b) by 535 days.

(21) Appl. No.: 09/635,827

(22) Filed: Aug. 10, 2000

(51) Int. Cl.[7] .............................................. G06F 17/60
(52) U.S. Cl. ............................ 705/36; 705/30; 705/35; 707/1; 715/504
(58) Field of Search ............................ 705/36, 30, 35; 707/1; 715/504

(56) References Cited

U.S. PATENT DOCUMENTS

| | | | |
|---|---|---|---|
| 6,336,094 B1 | * | 1/2002 | Ferguson et al. ............... 705/1 |
| 2004/0010463 A1 | * | 1/2004 | Hahn-Carlson et al. ....... 705/39 |

FOREIGN PATENT DOCUMENTS

| CA | 2294662 | * | 1/2000 | ........... G06F/17/20 |
|---|---|---|---|---|

OTHER PUBLICATIONS

Stephen O'Brien, "Quicken 6–in–1", chapters 11 & 12 http://cma.zdnet.com/book/quicken/fm/fm/htm.*

Dialog file 148, Accession No. 06706461, "Anlyzing your business: ratios/trend analysis and credit management.", Jul. 5, 1993, Drug Topics, v137, n13, p62 (9).*

Abbe et al., Quicken User Guide, Oct. 1992, Intuit, version 2 for windows, p. 199–201.*

* cited by examiner

*Primary Examiner*—James P. Trammell
*Assistant Examiner*—Jalatee Worjloh
(74) *Attorney, Agent, or Firm*—David B. Kelley

(57) ABSTRACT

An improved and automated method of analyzing data is provided. The method includes the steps of: gathering data from at least one field in financial statements from at least two different time periods or views; applying a volume variance subroutine against the gathered data; applying a mix variance subroutine against the gathered data; applying a net revenue change subroutine against the gathered data; applying a cost change subroutine against the gathered data; applying an exchange subroutine against the gathered data; applying a one-time subroutine against the gathered data; and reporting the results of the volume variance subroutine, the mix subroutine, the net revenue change subroutine, the cost change subroutine, the exchange subroutine, and the one-time subroutine.

19 Claims, 4 Drawing Sheets

AUTOMATED METHOD FOR ANALYZING AND COMPARING FINANCIAL DATA

TECHNICAL FIELD

The present invention relates to the area of financial data analysis.

BACKGROUND ART

In order for companies to remain competitive, companies must always monitor their revenues, sales and costs and determine the basis for changes in these items from one period to another period. Companies generally maintain income statements which reflect the various sources of revenue in addition to the origins of various costs.

Generally, income statements are produced in a spreadsheet hard copy format in which corporate accountants must manually sift through the information to determine reasons for differences in revenue, costs or profit from one period to another period. However, this method of financial analysis is labor and time intensive and expensive to companies. Accordingly, a need has developed for an improved and automated method of analyzing financial data.

DISCLOSURE OF INVENTION

A principal object of the present invention is to provide a automated method of analyzing financial data.

It is another object of the present invention to provide a method of analyzing data through the evaluation of standardized financial variables.

It is yet another object of the present invention to provide variance calculations for different time dimensions or views.

In carrying out the above objects and other objects and features, an improved and automated method of analyzing data is provided. The method preferably but not necessarily includes the steps of: gathering data from at least one field in two different financial statements; applying a volume variance subroutine against the gathered data; applying a mix variance subroutine against the gathered data; applying a net revenue change variance subroutine against the gathered data; applying a cost change variance subroutine against the gathered data; applying an exchange variance subroutine against the gathered data; applying a one-time variance subroutine against the gathered data; and reporting the results of the volume variance subroutine, the mix variance subroutine, the net revenue change variance subroutine, the cost change variance subroutine, the exchange variance subroutine, and the one-time variance subroutine.

BEST MODE FOR CARRYING OUT THE INVENTION

Figure 1:
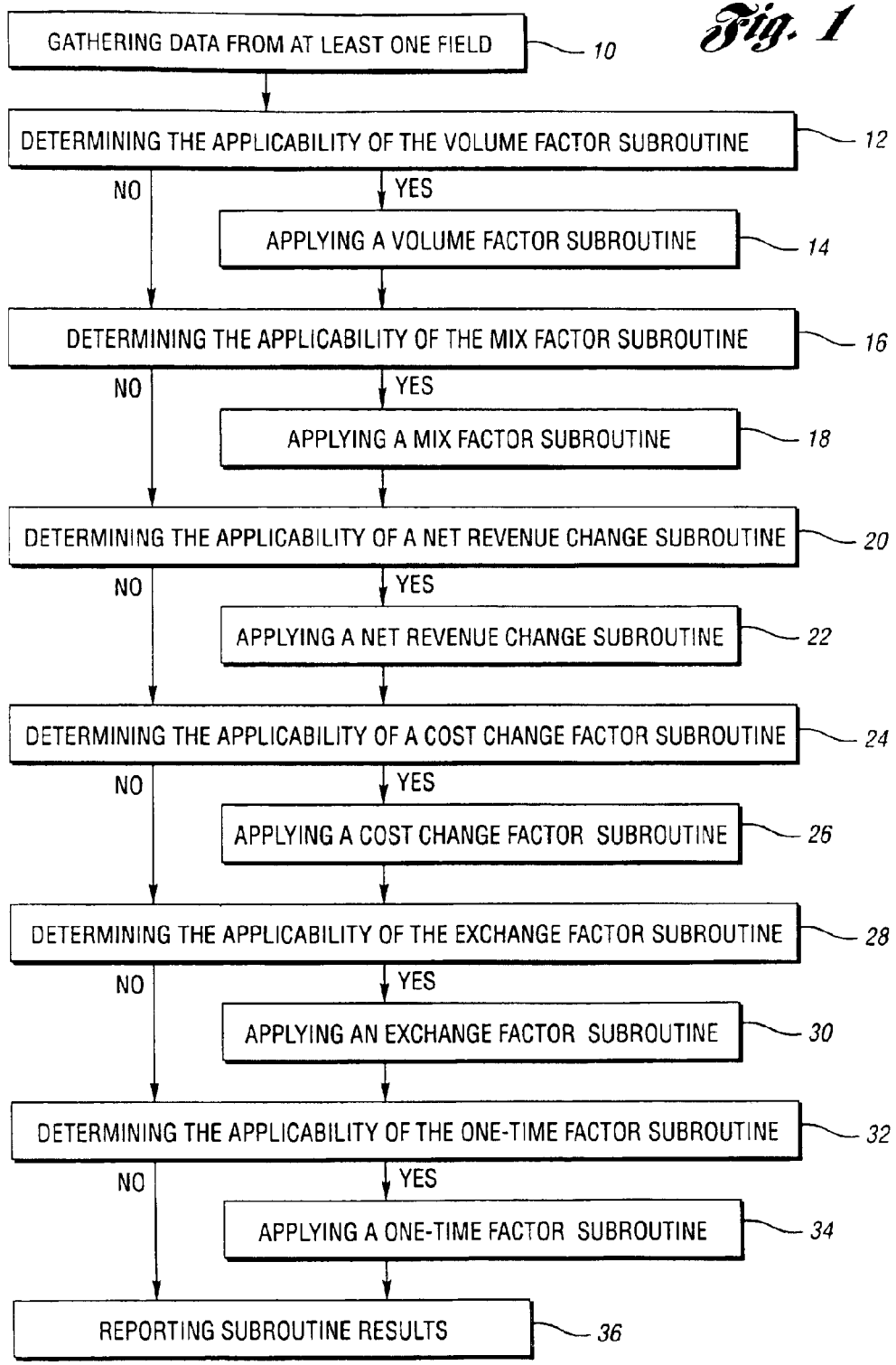
FIG. 1 is a flowchart which illustrates the method of the present invention.

With reference to FIG. 1, the method of the present invention is illustrated. As shown, the method of the present invention includes several steps which preferably but not necessarily may occur in the following order. First, data must be gathered 10 from at least one field in two different financial statements. The field in the financial statement includes financial information relating to a first period or view and a second period or view. When a view is used in lieu of a period, the same period may be analyzed and compared based upon different factors such as comparing the same time period under two different forecasts.

The financial statement is preferably an income statement which identifies several components of a financial system. The field or fields in the financial statement may include but is not limited to information such as product sales to dealers, marketing incentives, material costs, other costs and the like. The data in each field may be defined not only by the field itself but by a pre-determined time period such as a month, quarter, or year. Upon obtaining the data from each field, at least one subroutine 14 18 22 26 30 34 is applied against the data. In some cases, the system determines 12 16 20 24 28 32 whether the subroutine applies to a particular field in the financial statement. For example, the exchange subroutine might not be applied against a field relating to payroll in the event that there is no correlation between exchange rates and the payroll costs.

The subroutine or subroutines applied against the data are based upon causal factors which historically affect changes in revenue, costs or profits. For example, the present invention preferably involves six causal factors: (1) volume factor; (2) mix factor; (3) net revenue change factor; (4) cost change factor; (5) exchange factor; and (6) one-time factor. The six preferable factors are generally the basis for explaining changes in revenue, costs or profit.

The volume factor affects revenue and/or cost as product volume or number of products manufactured and/or sold changes. The mix factor affects revenue and/or cost as the sales of an upgraded version of a product in a series changes relative to a downgraded version. The net revenue change factor affects revenue as prices or marketing incentives change. The cost change factor illustrates how product program changes, ongoing product development changes, non-design changes or sourcing may affect cost. Finally, the exchange factor may affect revenue or cost as the exchange rate between two different currencies changes.

Figure 2:
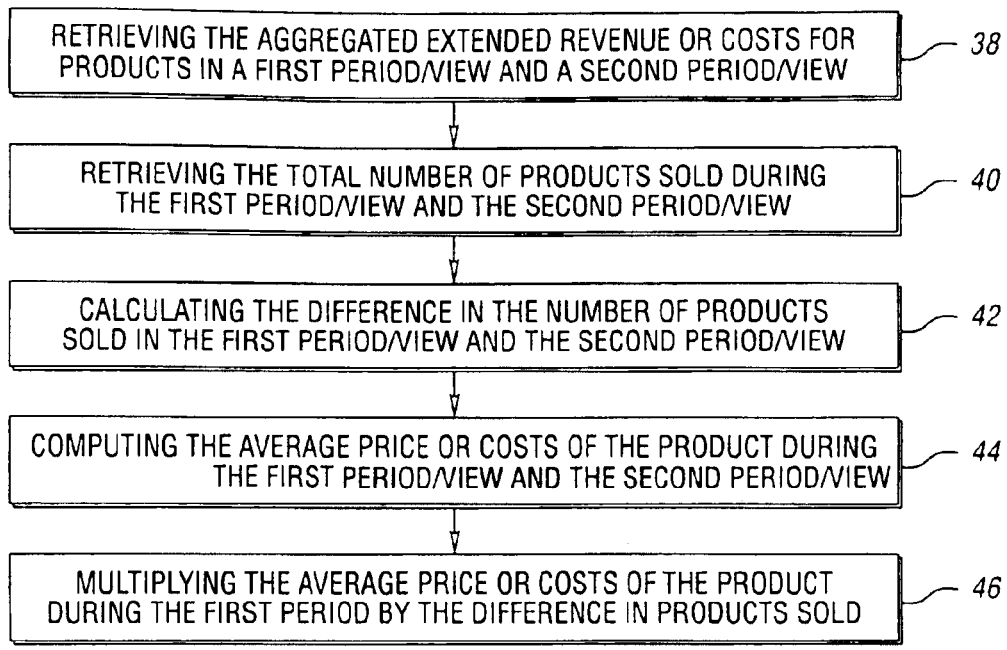
FIG. 2 is a flowchart which illustrates the volume variance subroutine.

As shown in FIG. 2, the volume factor subroutine is further illustrated in a flowchart format. The volume factor subroutine compares the data from the first period or view and the second period or view and identifies the revenue and cost differences due to differences in product volumes, measured at consistent price and exchange rate. The subroutine preferably applies the formula of $(V2-V1)*P1=VV$. V1 is the total volume of products sold in period 1, and V2 is the total volume of products sold in period 2. P1 is the average product price or cost from period 1 and VV is the volume variance or the revenue/cost difference due to a change in product volumes. The volume factor subroutine further breaks down the data according to several subcomponents: total industry, market share, mix among product lines, and dealer stock levels. The volume factor subroutine begins by retrieving 38 the aggregated extended revenue or costs for products in a first period and in a second period. The first period or view and the second period or view may be of any comparable length such as a quarter or a year. Second, the system retrieves 40 data such as the total number of products sold during the first period and the total number of products sold during the second period. Third, difference between the number of products sold in the first period and the second period is calculated 42. Fourth, the system computes 44 the average price or cost of the product-at-issue during the first period and during the second period. Fifth, the average price or cost during the first period is multiplied 46 by the difference in number of products sold between the first period and the second period. The resulting product is the volume variance which reflects the revenue and cost differences due to a change in product volume.

Figure 3:
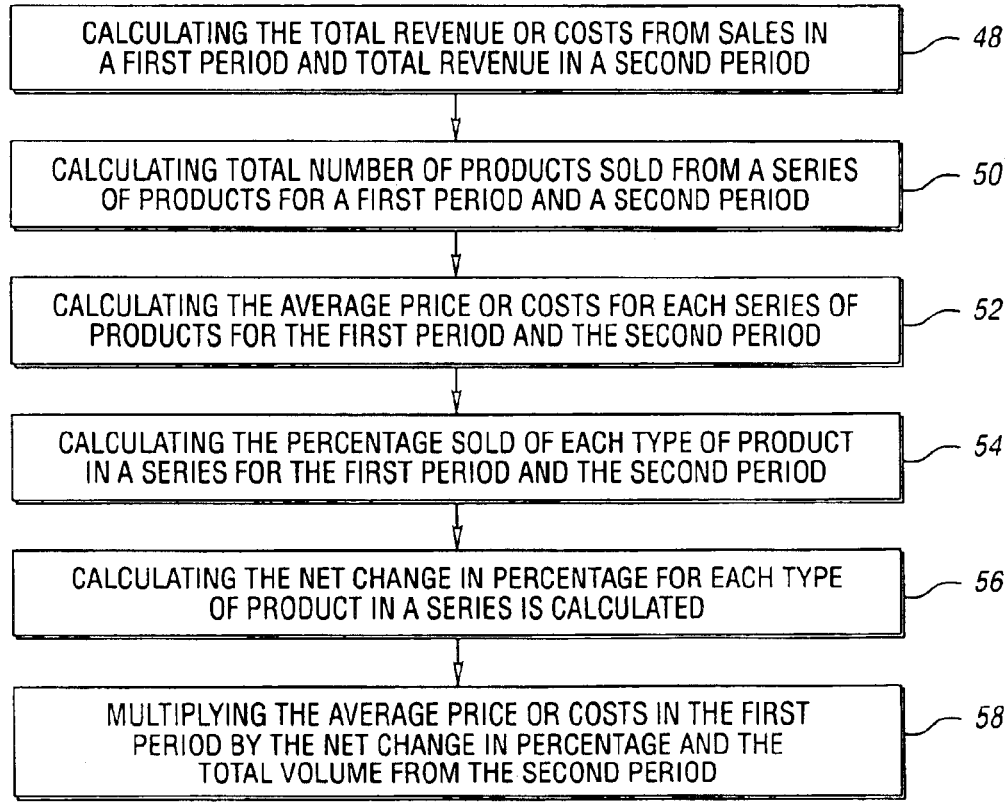
FIG. 3 is a flowchart which illustrates the mix variance subroutine.

Referring now to FIG. 3, the mix variance subroutine is further illustrated in a flowchart format. The mix variance subroutine determines the revenue and cost differences between the first period and the second period due to differences in the configuration mix within a product line and differences in option installation rates. This subroutine includes revenue and cost changes from options made standard and standard equipment made optional. The mix is measured at consistent price and exchange rates. The preferable formula applied from the data gathered is: (MRC*P1)*V2=MV. MRC is the mix rate change. P1 is the average price or cost from period 1 by configuration and option. V2 is the total volume from period 2. In performing this subroutine, first, the total revenue generated from a series of products and any additional options is calculated 48 for the first period and for the second period. Second, the total volume of products sold from a particular series and any additional options applicable to that series is calculated 50 for the first period and the second period. Third, the average price or cost for each series and each option is calculated 52 for the first period and for the second period. Fourth, the percentage sold of each type of product and option in the series is calculated 54 for the first period and the second period. Fifth, the net change in percentage for each type of product and option in a series is calculated 56. Sixth, the net change in the percentage may then be multiplied 58 by the average price in the first period and the total volume from the second period to obtain the mix variance or the revenue/cost difference due to a change in mix among configurations within a product line or a change in installation rate of options. This subroutine may apply to financial statement lines which involve product sales at dealerships, material costs or warranty costs and other similar items.

Figure 4:
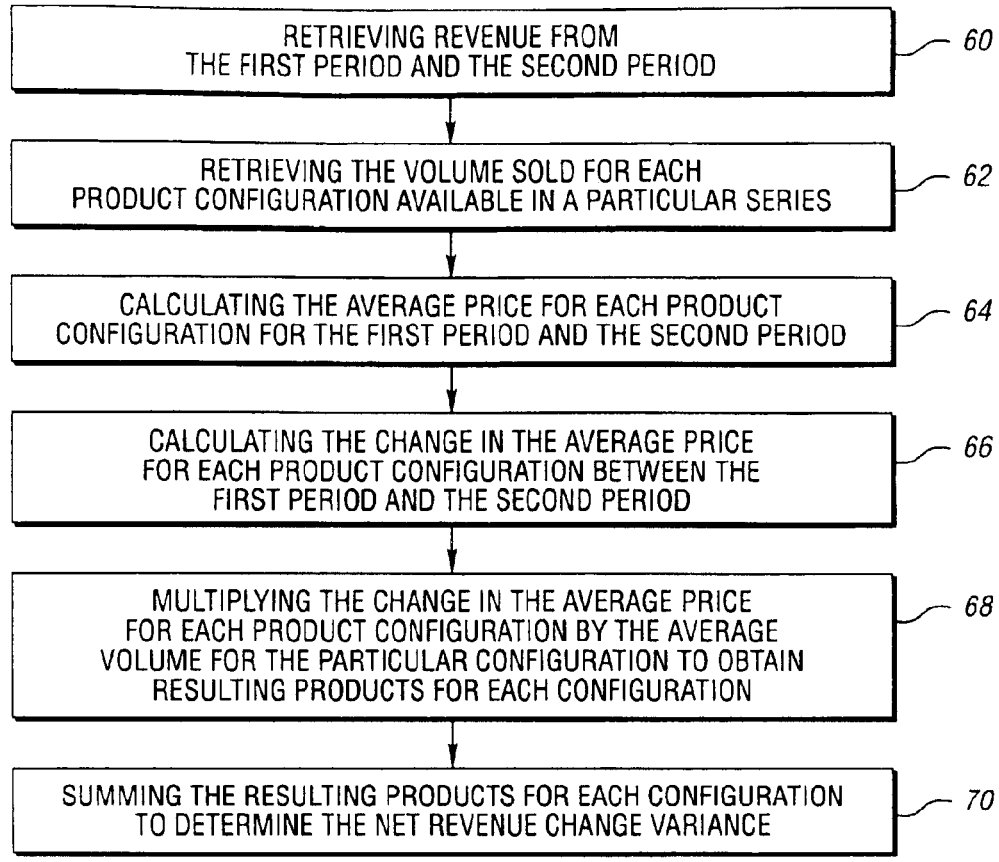
FIG. 4 is a flowchart which illustrates the net revenue change variance subroutine.

With reference to FIG. 4, the net revenue change subroutine is further illustrated in a flowchart format. The net revenue change subroutine determines the revenue differences due to differences in product sales prices or marketing incentives and other reasons not defined in any of the other revenue causal factors. The net revenue change is measured at consistent volume and exchange rates. This subroutine may be summarized in the following mathematical equation: NRCV=(P2−P1)*V2. P1 is the average price or cost from the first period or view. P2 is the average price or cost from the second period or view. V2 is the volume from period 2 by configuration and by option. The first step of this subroutine involves retrieving 60 revenue from the first period and the second period with respect to each configuration and option available in a particular product line. The second step involves retrieving 62 the volume sold for each configuration in a series and each option purchased. Third, the average price for each configuration and option is calculated 64 for the first period and the second period. Fourth, the change in the average price for each configuration and each option is calculated 66. Fifth, the change in the average price for each configuration is multiplied 68 against the volume for that particular configuration in the second period to obtain a resulting product for each configuration and option. Sixth, the resulting products for each configuration and option are summed 70 up to determine the net revenue change variance. As indicated above, the net revenue change variance is the revenue difference due to a change in per unit selling price or per unit variable marketing rate.

Figure 5:
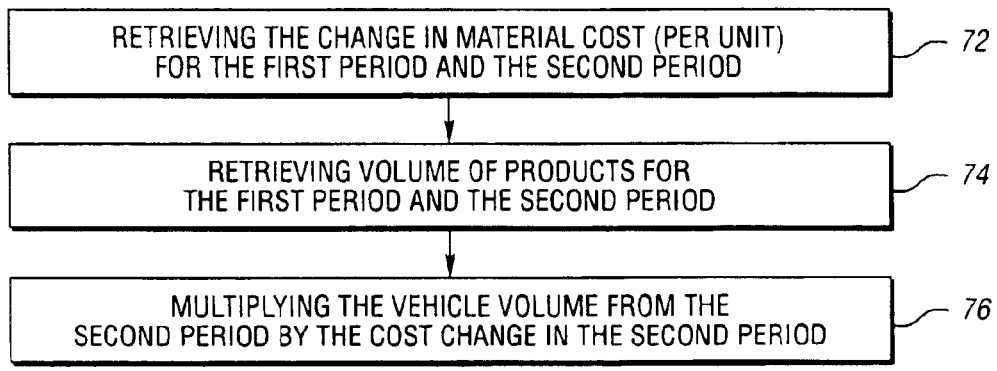
FIG. 5 is a flowchart which illustrates the cost change variance subroutine.

Referring now to FIG. 5, the cost change variance subroutine is illustrated in a flowchart format. The cost change factor subroutine determines the cost differences due to product program changes, ongoing product development changes, non-design changes, sourcing and other reasons not defined in any of the other cost causal factors. This is measured at consistent volume and exchange rates. This subroutine may be summarized by the following mathematical equation: CCV=V2*CC2. V2 is the total volume from the second period. CC2 is the per unit cost changes for the second period by causal factor. The first step of this subroutine involves retrieving 72 the material cost change per unit for the first period and for the second period. Second, the subroutine obtains 74 the product volumes by configuration for the first period and for the second period. Third, the product volume of the second period is multiplied 76 by the cost change in the second period. The resulting data from this subroutine is the cost change variance which illustrates cost differences due to product program changes, ongoing product development changes, non-design changes, or sourcing out labor to contractors.

Figure 6:
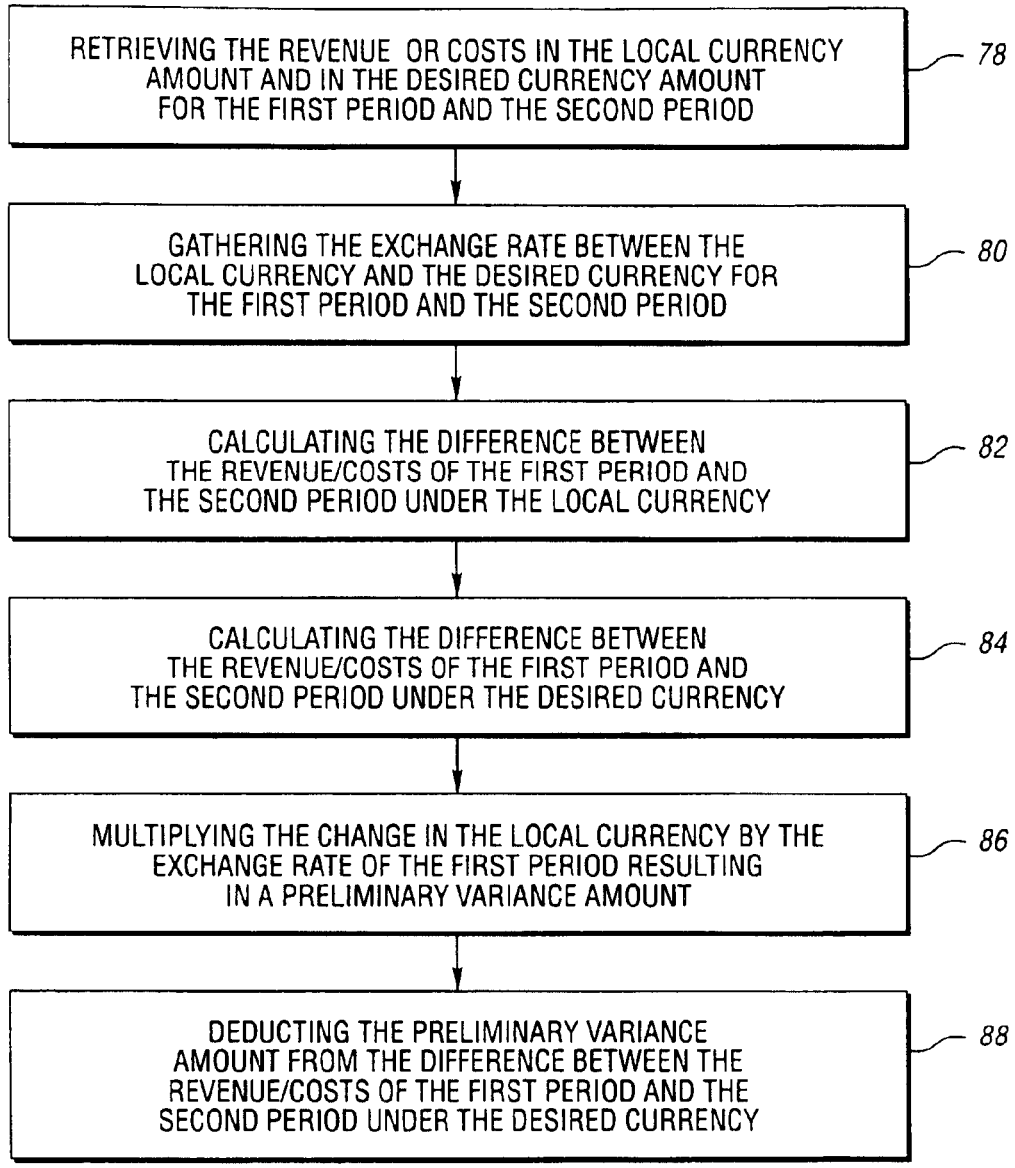
FIG. 6 is a flowchart which illustrates the exchange variance subroutine.

With reference to FIG. 6, the exchange factor subroutine is in a flowchart format. The exchange factor subroutine determines the revenue and cost differences due to differences in currency exchange rates. The exchange factor subroutine involves the following mathematical formula: EV=CD−(CL*XR1). CD is the change in the financial statement line item in the desired currency. The desired currency is the financial amount stated in the currency being reported in a financial statement. CL is the change in the financial statement line item in the local currency. The local currency is the revenue or the amount denoted in the currency of a country in which financial activity occurs. XR1 is the exchange rate between the two currencies from the first period. The subroutine includes several steps. First, the system retrieves 78 the revenue or cost stated in the local currency and in the desired currency for the first period and the second period. Second, the system gathers 80 the exchange rate between the local currency and the desired currency for the first period and for the second period. Third, the system calculates the difference between the financial amounts of the first period and the second period with respect to the local currency 82 then, fourth, with respect to the desired currency 84. Fifth, the change in the local is multiplied 86 by the exchange rate of the first period resulting in a preliminary variance amount. Sixth, the preliminary variance amount is deducted 88 from the previously determined difference between the first period and the second period stated in the desired currency. The resulting difference is the exchange variance which reflects the revenue and cost differences due to a change in exchange rates.

With respect to the one-time factor subroutine, this subroutine may be modified according to the particular circumstances during the specified time periods. This subroutine determines the variance in revenue or cost for unusual or infrequent items such as a plant shutdown or employee separation programs. The unique parameters of the unusual circumstance are accounted in determining changes in revenue or cost from a first period to a second period.

The words in the specification are words of description rather than limitation, and it is understood that various changes may be made without departing from the spirit and scope of the invention.

While the best mode for carrying out the invention has been described in detail, those familiar with the art to which this invention relates will recognize various alternative designs and embodiments for practicing the invention as defined by the following claims.

What is claimed is:

1. An automated method of analyzing and comparing financial data, the method comprised of:

gathering data from at least one field in at least two different financial statements;

determining the applicability of a first subroutine to the gathered data;

if applicable, applying the first subroutine to the gathered data;

determining the applicability of a second subroutine to the gathered data;

if applicable, applying the second subroutine to the gathered data;

determining the applicability of a third subroutine to the gathered data;

if applicable, applying the third subroutine to the gathered data, wherein at least one of the subroutines is applicable; and electronically reporting the results of the first subroutine, the second subroutine, and the third subroutine to identify underlying factors which cause changes in revenue and cost, wherein the first subroutine is a volume variance subroutine, a mix variance subroutine, a net revenue change variance subroutine, a cost change variance subroutine, an exchange variance subroutine or a one-time subroutine.

2. The method defined in claim 1 wherein the second subroutine is a volume variance subroutine, a mix variance subroutine, a net revenue change variance subroutine, a cost change variance subroutine, an exchange variance subroutine or a one-time subroutine and the second subroutine is not the same as the first subroutine.

3. The method defined in claim 1 wherein the third subroutine is a volume variance subroutine, a mix variance subroutine, a net revenue change variance subroutine, a cost change variance subroutine, an exchange variance subroutine or a one-time variance subroutine and the third subroutine is not the same as the first and second subroutines.

4. The method defined in claim 1 further comprising determining the applicability of a fourth subroutine to the gathered data; and if applicable, applying the fourth subroutine to the gathered data.

5. The method defined in claim 4 further comprising determining the applicability of a fifth subroutine to the gathered data; and if applicable, applying the fifth subroutine to the gathered data.

6. The method defined in claim 5 further comprising determining the applicability of a sixth subroutine to the gathered data; and if applicable, applying the sixth subroutine to the gathered data.

7. The method defined in claim 5 wherein the fifth subroutine is a volume variance subroutine, a mix variance subroutine, a net revenue change variance subroutine, a cost change variance subroutine, an exchange variance subroutine or a one-time variance subroutine.

8. The method defined in claim 6 wherein the sixth subroutine is a volume variance subroutine, a mix variance subroutine, a net revenue change variance subroutine, a cost change variance subroutine, an exchange variance subroutine or a one-time variance subroutine.

9. The method defined in claim 4 wherein the fourth subroutine is a volume variance subroutine, a mix variance subroutine, a net revenue change variance subroutine, a cost change variance subroutine, an exchange variance subroutine or a one-time variance subroutine.

10. The method defined in claim 1 wherein the first subroutine, the second subroutine, and the third subroutine compare data from a first period with data from a second period.

11. An automated method of analyzing and comparing financial data, the method comprised of:

gathering data from at least one field in at least two different financial statements;

determining the applicability of a volume variance subroutine to the gathered data;

if applicable, applying the volume variance subroutine against the gathered data resulting in volume variance data;

determining the applicability of a mix variance subroutine to the gathered data;

if applicable, applying the mix variance subroutine against the gathered data resulting in mix variance data;

determining the applicability of a net revenue change variance subroutine to the gathered data;

if applicable, applying a net revenue change variance subroutine against the gathered data resulting in net revenue variance data;

determining the applicability of a cost change variance subroutine to the gathered data;

if applicable, applying the cost change variance subroutine against the gathered data resulting in cost change variance data;

determining the applicability of an exchange variance subroutine to the gathered data;

if applicable, applying the exchange variance subroutine against the gathered data resulting in exchange variance data;

determining the applicability of a one-time variance subroutine to the gathered data;

if applicable, applying the one-time subroutine against the gathered data resulting in one-time variance data, wherein at least one subroutine is applicable; and electronically reporting the output of the one or more applicable subroutines in the form of the volume variance data, the mix variance data, the net revenue variance data, the cost change variance data, the exchange variance data, and the one-time variance data to identify the basis for changes in profit, revenue, and costs.

12. The method defined in claim 11 wherein, the volume variance subroutine is further comprised of:

retrieving the aggregated extended revenue or costs for products in a first period and in a second period;

retrieving the total number of products sold during the first period and the total number of products sold during the second period;

deducting the number of products sold in the first period from the number of products sold during the second period;

calculating the average price or costs of the product during the first period and the average price of the product during the second period; and multiplying the average price or cost during the first period is by the difference in number of products sold between the first period and the second period resulting in a volume variance reflecting the revenue and cost differences due to a change in product volume.

13. The method defined in claim 11 wherein the mix variance subroutine is further comprised of:

retrieving the total revenue generated from a series of products for a first period and for a second period;

retrieving the total volume of products sold from the series of products for the first period and the second period;

calculating the average price for the series for the first period and for the second period;

calculating the percentage sold for each type of product in the series for the first period and the second period;

calculating the net change in percentage for each type of product in a series by subtracting the percentage of each type of product for the first period from the percent of each type of product for the second period;

multiplying the net change in the percentage by the average price in the first period and by the total volume from the second period resulting in a mix variance, the mix variance being the differences due to a change in mix among configurations within a product line or a change in installation rate of options.

14. The method defined in claim 11 wherein the mix variance subroutine is further comprised of:

retrieving the cost generated from a series of products for a first period and for a second period;

retrieving the total volume of products sold from the series of products for the first period and the second period;

calculating the cost for the series for the first period and for the second period;

calculating the percentage sold for each type of product in the series for the first period and the second period;

calculating the net change in percentage for each type of product in a series by subtracting the percentage of each type of product for the first period from the percent of each type of product for the second period;

multiplying the net change in the percentage by the average price in the first period and by the total volume from the second period resulting in a mix variance, the mix variance being the differences due to a change in mix among configurations within a product line or a change in installation rate of options.

15. The method defined in claim 11 wherein the net revenue subroutine is further comprised of:

retrieving revenue from the first period and the second period with respect to each configuration and option available in a particular series;

retrieving the volume sold for each configuration in a series and each option purchased;

calculating the average price for each configuration and option for the first period and the second period;

calculating the change in the average price for each configuration and each option;

multiplying the change in the average price for each configuration by the volume for that particular configuration in the second period to obtain a resulting product for each configuration; and summing up the resulting products for each configuration and option to determine the net revenue change variance.

16. The method defined in claim 15 wherein the step of multiplying is further comprised of multiplying the price for each option by the volume of the options purchased.

17. The method defined in claim 11 wherein the volume factor variance subroutine is comprised of:

retrieving the change in material cost per unit for the first period and for the second period;

gathering product volume data for at least one configuration for the first period and for the second period; and multiplying the product volume of the second period by the cost change in the second period.

18. The method defined in claim 11 wherein the exchange variance subroutine is comprised of:

retrieving the revenue in the local currency amount and in the desired currency amount for the first period and the second period;

gathering the exchange rate between a local currency and a desired currency for the first period and for the second period;

calculating the difference between the revenue of the first period and the second period with respect to the local currency then with respect to the desired currency;

multiplying the exchange rate of the first period resulting in a preliminary variance amount;

deducting the preliminary variance amount from the previously determined difference between the first period and the second period under the desired currency.

19. The method defined in claim 11 wherein the exchange variance subroutine is comprised of:

retrieving the revenue in the local currency amount and in the desired currency amount for the first period and the second period;

gathering the exchange rate between a local currency and a desired currency for the first period and for the second period;

calculating the difference between the costs of the first period and the second period with respect to the local currency then with respect to the desired currency;

multiplying the exchange rate of the first period resulting in a preliminary variance amount;

deducting the preliminary variance amount from the previously determined difference between the first period and the second period under the desired currency.

* * * * *